United States Patent [19]
Eschbach et al.

[11] Patent Number: 5,704,840
[45] Date of Patent: Jan. 6, 1998

[54] UNIVERSAL JOINT

[75] Inventors: Markus Eschbach, Overath; Peter Schwärzler, Glattbach; Hans-Heinrich Welschof, Rodenbach, all of Germany

[73] Assignee: Löhr & Bromkamp GmbH, Offenbach am Main, Germany

[21] Appl. No.: 526,008

[22] Filed: Sep. 8, 1995

[30] Foreign Application Priority Data

Sep. 10, 1994 [DE] Germany ............... 44 32 230.5

[51] Int. Cl.⁶ ............................................. F16D 3/22
[52] U.S. Cl. ........................ 464/143; 464/141; 464/906
[58] Field of Search ............................ 464/139, 141, 464/143, 147, 906

[56] References Cited

U.S. PATENT DOCUMENTS

| | | |
|---|---|---|
| 2,140,295 | 12/1938 | Mallard. |
| 2,653,456 | 9/1953 | Heym ............................ 464/141 |
| 2,968,936 | 1/1961 | Croset ............................ 464/141 |
| 3,362,192 | 1/1968 | Orain ......................... 464/143 X |
| 4,249,395 | 2/1981 | Krude et al. ..................... 464/143 |
| 5,376,052 | 12/1994 | Jacob et al. .................. 464/906 X |

FOREIGN PATENT DOCUMENTS

| | | |
|---|---|---|
| 2740226A1 | 3/1979 | Germany. |
| 3710518C1 | 7/1988 | Germany. |
| 3729275A1 | 3/1989 | Germany. |
| 4029930A1 | 3/1992 | Germany. |
| 187297 | 1/1937 | Switzerland. |

*Primary Examiner*—Daniel P. Stodola
*Assistant Examiner*—Eileen A. Dunn
*Attorney, Agent, or Firm*—Harness, Dickey & Pierce, P.L.C.

[57] ABSTRACT

A universal joint for small articulation angles has parallel, longitudinally extending tracks in the inner joint part and in the outer joint part and axially freely movable torque transmitting balls held in an uncontrolled way in the tracks. The tracks in the two joint parts include a constant cross-section adapted substantially, without a clearance, to the balls. The rolling movement of the balls is limited by axial stops in one of the joint members. The inner joint part includes outer spherical surface parts which are interrupted by the tracks. The spherical surface parts act as sliding faces. The outer joint part includes inner surface parts which are interrupted by the tracks and which act as guiding faces. When the joint is articulated, the surface parts which act as guiding faces, supportingly act on the surface parts acting as sliding faces around at least one fulcrum positioned on the longitudinal axis of the outer joint part.

14 Claims, 4 Drawing Sheets

UNIVERSAL JOINT

BACKGROUND OF THE INVENTION

The invention relates to a universal joint for small articulation angles. The joint includes parallel, longitudinally extending tracks in the inner joint part and in the outer joint part with axially freely movable torque transmitting balls held in an uncontrolled way in the tracks. The tracks in the two joint parts include a constant cross-section adapted substantially, without a clearance, to the balls. The rolling movement of the balls is limited by axial stops in one of the joint members.

Universal joints are described in DE 37 10 518 C1 published Jul. 28, 1988, and DE 37 29 275 A1 published Mar. 16, 1989, and in DE 40 29 930 A1 published Mar. 26, 1992. The joints referred to in those publications are plunging joints which do not include any means for axially supporting the joint components relative to one another.

U.S. Pat. No. 2,653,456 discloses a joint where surface portions, arranged concentrically in the longitudinal section between the ball tracks in the inner joint part ensure that the joint components, are supported relative to one another, however, the balls in the outer joint part are fixed so as to be clearance-free in the longitudinal direction. To permit an angular movement of the joint parts relative to one another, the tracks in the cross-section, in the inner joint part include play relative to the balls. This means that when the joint is articulated, substantially only two balls have a carrying function.

SUMMARY OF THE INVENTION

It is an object of the present invention to provide a joint of the initially mentioned type which is of simple design and includes means for supporting the joint components relative to one another. The invention provides a fixed joint which retains its ability to function satisfactorily.

The objective is achieved by the inner joint part including outer spherical surface parts which are interrupted by the tracks and act as sliding faces. The outer joint part includes inner surface parts which are interrupted by the tracks and act as guiding faces. When the joint is articulated, the surface parts act as guiding faces around at least one fulcrum positioned on the longitudinal axis of the outer joint part.

According to the advantageous embodiment, either as individual or combined measures, the surface parts in the outer joint part, which act as guiding faces, each include surface parts axially spaced from one another, which, are positioned at both ends of the tracks. The surface parts in the outer joint part, acting as guiding faces, are internally spherical or internally conical. In the area of contact with the surface parts of the inner joint part, which act as sliding faces, the surface parts in the outer joint part, which act as guiding faces, are positioned on a spherical surface around one single fulcrum on the longitudinal axis of the outer joint part.

According to a further advantageous embodiment, which is easy to produce, in a longitudinal section, the track center lines in both joint parts extend linearly and in an axis-parallel way. According to a second embodiment, in a longitudinal section, the track center lines, at least in the inner joint part, extend in a circular arch around the joint center.

In an embodiment which is advantageous from a production technology standpoint, the outer joint part includes two formed parts which are preferably produced as cold-formed parts. The parts do not require any subsequent machining, especially as formed plate metal parts.

The formed parts may be designed such that one of the formed parts includes the ball tracks and first axial stops for the balls. The second formed part includes second axial stops for the balls. As a result, one of the parts may advantageously be provided in the form of a rotational part.

Furthermore, in an advantageous embodiment, each of the two formed parts may constitute parts of the portions of the inner contour of the outer joint part which cooperate with the outer contour of the inner joint part between the tracks. The surface parts which act as guiding faces may be limited to two small regions of spherical shape or two axially spaced regions with linear contact.

However, it is also possible for at least parts of the portions of the inner contour to be formed by a sleeve member which is inserted into the outer part. The sleeve has to have an adequate wall thickness and include an internally spherical or conical recess to be able to cooperate with the outer contour of the inner joint part.

According to a further embodiment, all portions of the inner surface are formed by the sleeve member which is inserted into the outer part. The sleeve member has to be provided with circumferentially distributed apertures to receive the balls freely movable therein when the joint is articulated. By introducing the sleeves, it is possible to simplify the operation of forming the outer joint part components forming the tracks.

As far as the inner joint part is concerned, in a preferred embodiment, it includes at least two disc members. One of the disc members forms first axial stops for the balls and the at least one second disc member forms the tracks. According to a further embodiment, the second disc member may simultaneously form second axial stops. According to an additional embodiment, a third disc member forms second axial stops. By distributing the axial stops to two or three disc members, the operation of forming the individual parts is simplified.

The axial stops for the balls in the outer joint part and those in the inner joint part may both be rotationally symmetrical surfaces. As far as the parts forming the tracks are concerned, the inner contour and outer contour, in cross-section through the outer joint, have to be adapted to the balls.

As an alternative to using discs to form the inner joint part, the latter may include a one-piece formed member which, itself, forms both axial stops for the balls and the tracks. In a particularly advantageous embodiment, the inner joint part may include a one-piece tubular member or circular plate which is butt-welded to an adjoining tubular shaft or which may even be integral with such a tubular shaft.

Additional objects and advantages of the invention will be apparent from the detailed description of the preferred embodiment, the appended claims and the accompanying drawings, or may be learned by practice of the invention.

BRIEF DESCRIPTION OF THE DRAWINGS

Preferred embodiments of the invention are illustrated in the drawings wherein.

3

Figure 3:
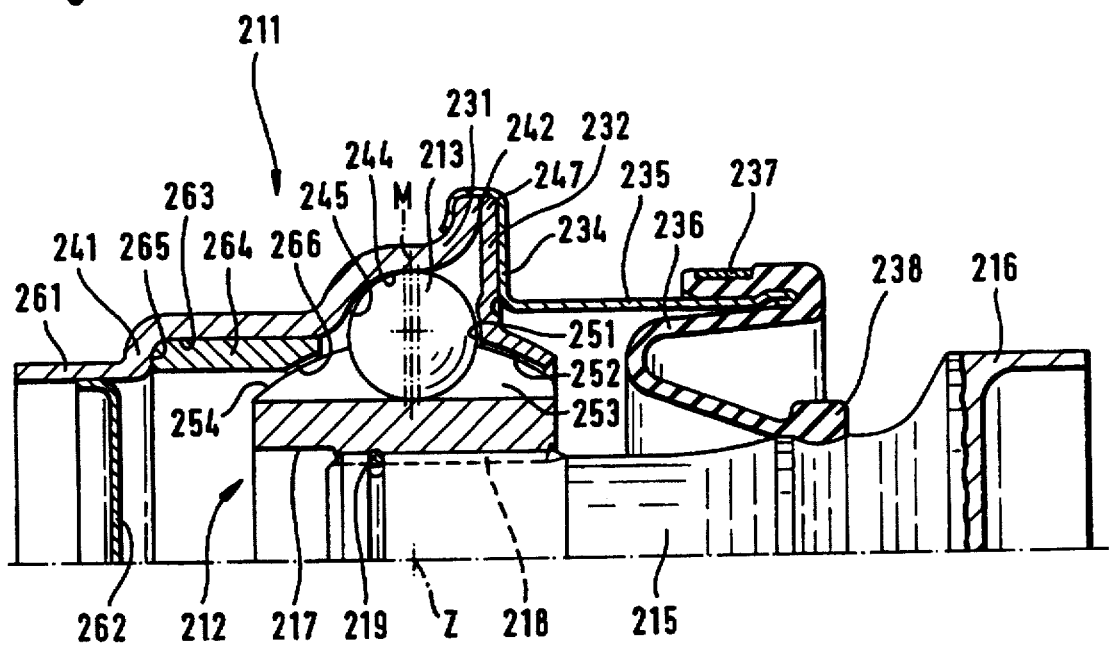

FIG. 3 is a cross-section view of a joint of another embodiment in accordance with the invention.

Figure 4:
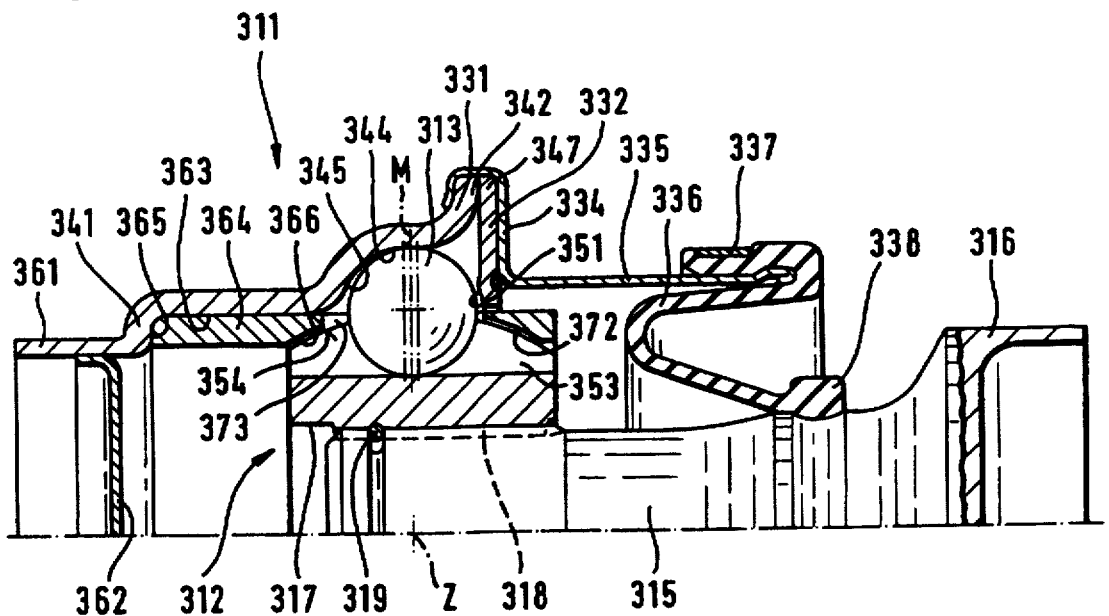

FIG. 4 is a cross-section view of a joint in accordance with the invention similar to FIG. 3, with a longer sleeve provided with recesses.

Figure 1:
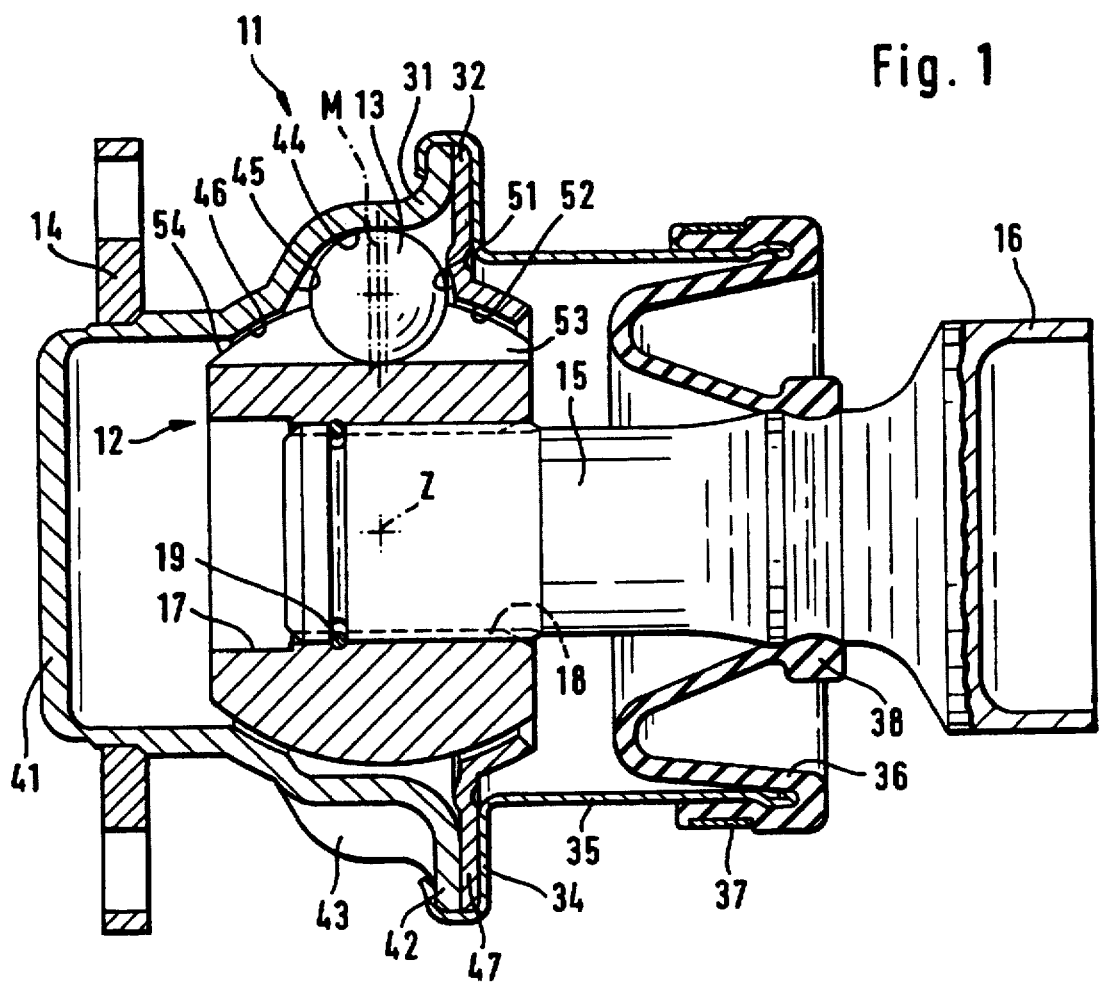
FIG. 1 is a cross-section view of a joint in accordance with the invention, having a two-component outer joint part.
Figure 5:
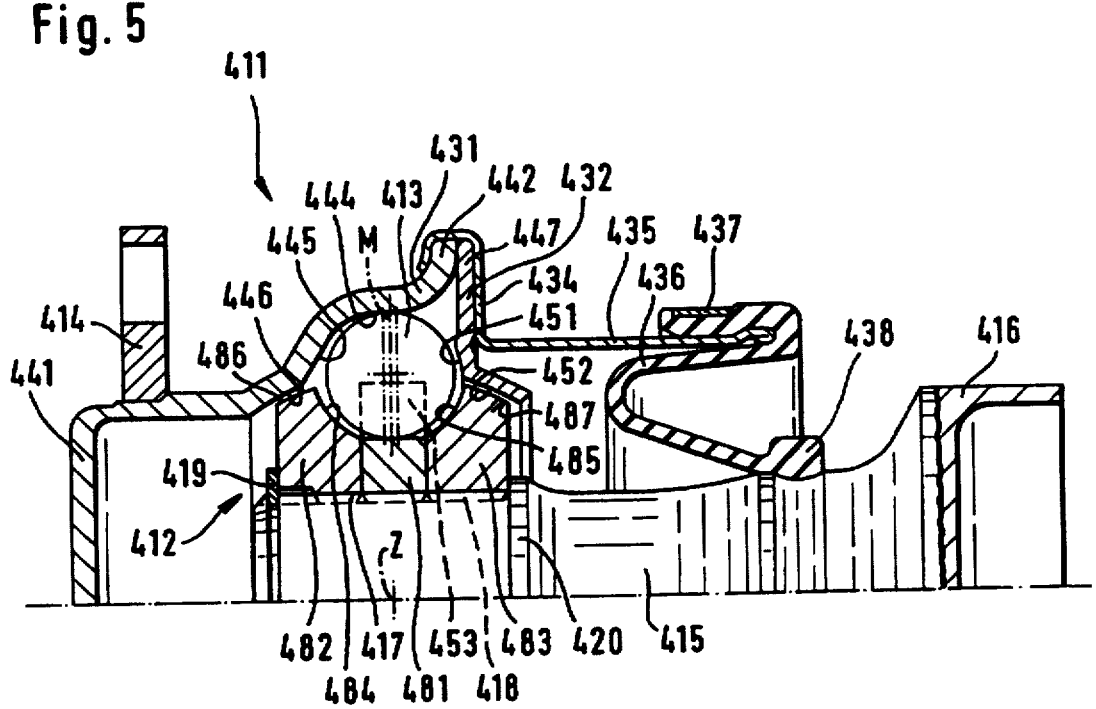

FIG. 5 is a cross-section view of a joint in accordance with the invention similar to FIG. 1 with an inner joint part including three discs.

Figure 6:
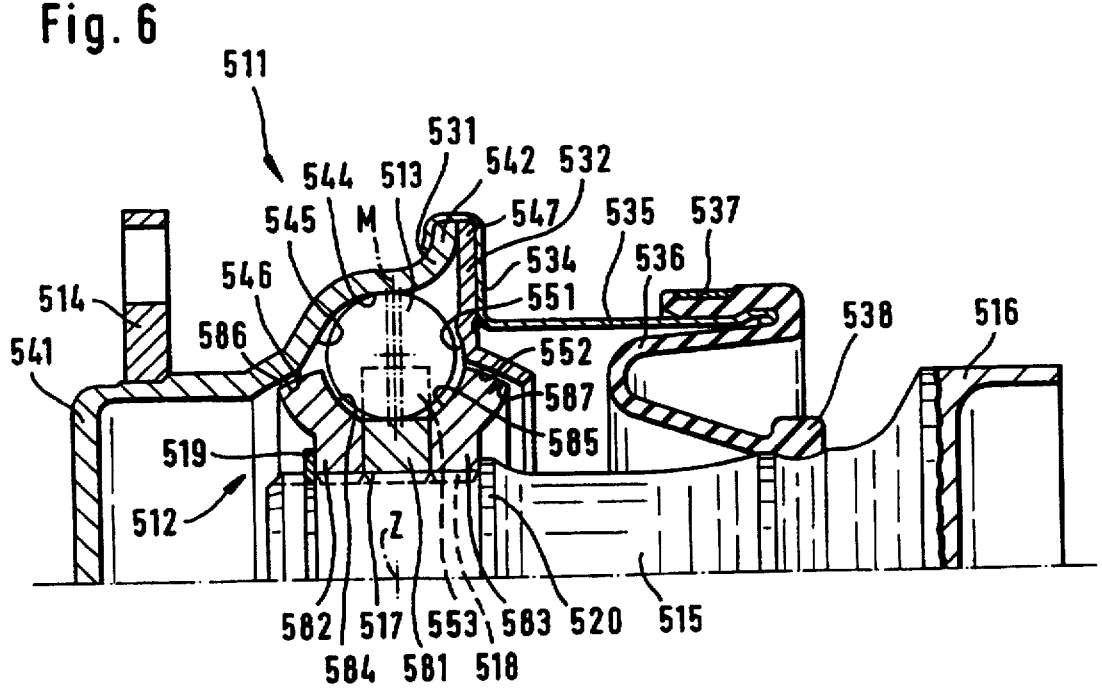

FIG. 6 is a cross-section view of a modified joint in accordance with the invention as compared to that shown in FIG. 5.

Figure 7:
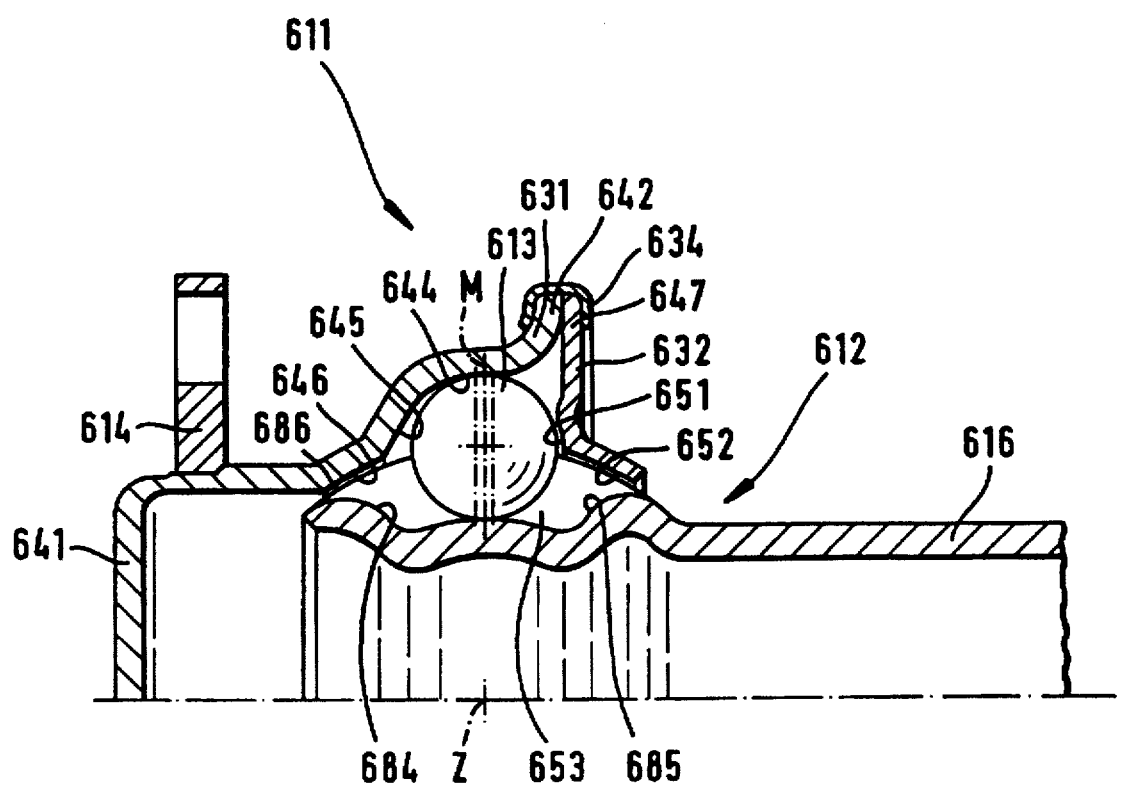

FIG. 7 is a cross-section view of a joint in accordance with the invention similar to FIG. 1, with an inner joint part formed of plate metal part.

DETAILED DESCRIPTION OF THE PREFERRED EMBODIMENT

FIG. 1 illustrates a constant velocity universal joint shown in the form of a fixed joint. The joint includes an outer joint part 11, an inner joint part 12 and torque transmitting balls 13. The outer joint part 11, which will be explained in greater detail below, is connected to a slide-on annular flange 14. A plug-in journal 15 is connected to an adjoining tubular shaft 16 and is inserted into the inner joint part 12. The inner joint part 12 is provided with a through-aperture 17. The non-rotating connection between the plug-in journal 15 and the inner joint part 12 is provided in the usual way by shaft teeth 18, with the two parts axially connected to one another by a securing ring 19 which engages annular grooves.

The outer joint part includes a bowl-shaped part 31, preferably deep-drawn from a disc, and a cover like part 32, preferably produced from a circular blank. Both are connected to one another by a plate metal part 34 embracing adjoining flange parts in a U-shaped form. The plate metal part 34 continues in a cylindrical portion 35. The free end of the cylindrical portion 35 is secured to a rolling boot 36 by means of a tensioning strip 37. The boot 36 is also secured to the plug-in journal 15 by an annular bead 38.

The first bowl-shaped part 31 of the outer joint part, at one end, in the region of the slide-on flange 14, includes a stiffening base 41. At the other end of part 31, it includes a radially outwardly extending flange 42. Between the ends are circumferentially distributed formations 43 which form the ball tracks 44 in the outer joint part and first axial stop faces 45 for the balls at the axial ends of the formations. Furthermore, the first part 41 of the outer joint part forms internally spherical first surface parts 46. The surface parts 46 have a guiding function for the inner joint part. In contrast to the ball tracks 44 and the axial stop faces 45, the surface parts 46 may be rotational faces.

The second cover-like part 32 includes an outer flange 47, forms second axial stop faces 51 for the balls and includes internally spherical second surface parts 52 which have a guiding function for the inner joint part. As can be identified in the section, the stop faces 51 are also adapted to the spherically shaped, thus generating a surface or line contact with the balls. However, it would also be possible to design the stop faces 51 and the surface parts 52 entirely as rotational faces, thus providing a transition to point contact.

As is illustrated by three parallel central planes M, the balls 13 freely move axially between the stop faces 45 and 51. Between the two outer central planes, the ball tracks 44 are provided with a constant cross section. The center lines of the ball tracks extend in an axis-parallel was in this region.

4

Apart from the details already described, the inner joint part 12 includes ball tracks 53 whose center lines also extend linearly and in an axis-parallel way. The inner joint part, on its outer face, includes spherical surface parts 54 which cooperate with the surface parts 46 and 52 of the inner face of the outer joint part to accommodate axial supporting forces and have a guiding function in the case of articulation around the joint center Z. Mutual support takes place in a substantially clearance-free way. The size of the identifiable gap is exaggerated in the illustration.

The joint includes a cage which holds the balls 13 in a common plane. The balls are freely movable between the planes M. The axial distance between the stops is such that the joint is able to articulate by angles of ±5°.

When the illustrated joint is assembled, the inner joint part 12 and the balls 13 are axially inserted into the first component 31 of the outer joint part 11, before, subsequently, being complemented and closed by the second component 32 of the outer joint part.

Figure 2:
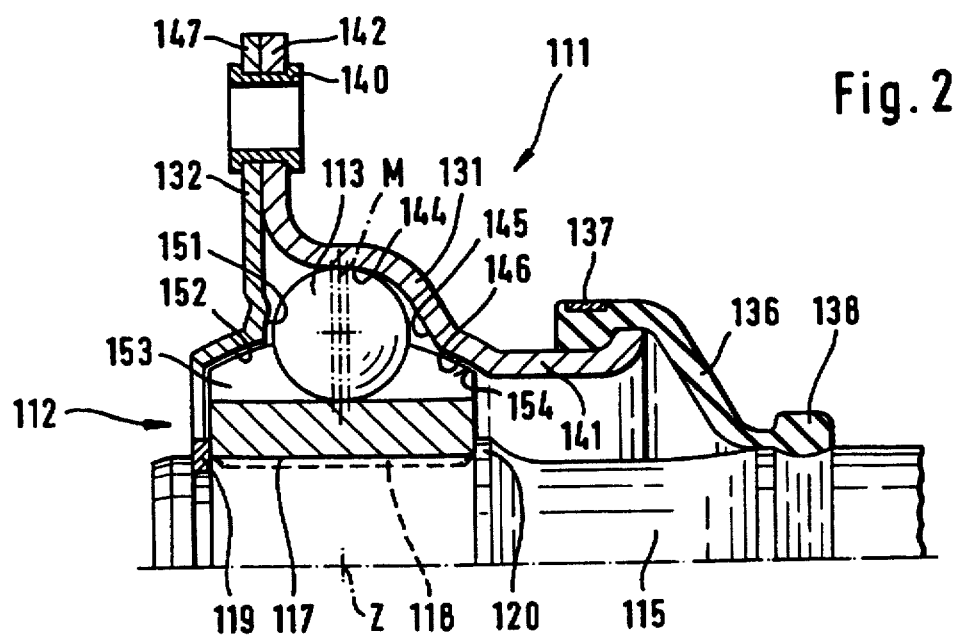
FIG. 2 is a cross-section view of a modified joint in accordance with the invention as compared to that shown in FIG. 1.

FIG. 2 shows a modified version of the constant velocity universal joint illustrated in FIG. 1, with corresponding details being given reference numbers increased by 100. A substantial modification has been carried out on the outer joint part 111. The first component 131, with respect to its main functional parts relative to the plug-in journal 115, is aligned mirror-image-like as compared to the above-described part 31.

Instead of the above-mentioned base, a cylindrical projection 141 is provided with the outer joint part assembled such that the projection 141 points towards the plug-in journal 115. A boot element 136 is fixed to the projection 141 by a tensioning strip 137. The other end of the boot is provided with a bead 138 which, through internal tension, is secured to the plug-in journal 115. Opposite the projection 141 is an enlarged flange 142 with the corresponding flange 147 of the second component 132 of the outer joint part being secured thereto. The two flange faces 142, 147 are connected to one another at least by hollow rivets 140 which form filing holes to fix the outer joint part 111 to a counter-flange.

Again, the connection between the plug-in journal 115 and the through aperture 117 of the inner joint part 112 includes shaft teeth 118 and a securing ring 119. The plug-in journal 115 axially projects beyond the inner joint part 112. The inner joint part 112 stops against a collar 120. The tracks 144 in the outer joint part include a constant cross-section in the region between the central planes M. The balls 113 are freely movable between the stops 145 in the first component 131 and the stops 151 in the second component.

In the same way as before, surface parts 146 of the inner surface of the first component 131 and surface parts 152 of the inner surface of the second component 132 of the outer joint part are designed as rotational faces. The surface parts 154 of the outer surface of the inner joint part 112, with their spherical shape, can be seen to be complementary thereto. The axially extending tracks 153 in the inner joint part are illustrated in the same way.

FIG. 3 is a half section through a constant velocity universal joint in an embodiment similar to that illustrated in FIG. 1. The reference numbers of any parts corresponding to those shown in FIG. 1 have been increased by 200. The two embodiments coincide to a considerable extent so that below, only the differences in the embodiment to FIG. 3 will be referred to, otherwise reference is made to the description of FIG. 1.

Instead of a closed base, the component 231 of the outer joint part 211 includes an inner step 241 and thereafter, changes into a tubular member 261. The open cross-section of the tubular member 261 is closed by a clamped-in cover 262. In the region directly adjoining the ball stops 245, the component 231 extends in the form of an internally cylindrical portion 263 so that spherical surface parts of the inner surface of the component 231 are not formed directly. A sleeve 264 is inserted into the internally cylindrical portion 263 which axially stops against the inner surface 265 of the step 241. The sleeve 264 includes an internally spherical surface 266 which replaces the surface part 46 shown in FIG. 1. The sleeve 264 is preferably fitted in the outer part by a press-fit.

FIG. 4 is a half longitudinal section through a constant velocity universal joint in accordance with the invention, which is similar to that shown in FIG. 1. The reference numbers of any details which correspond to one another will be increased by 300. The two embodiments are largely identical, so that only the differences will be referred to, whereas otherwise reference is made to the description of FIG. 1.

Instead of a closed base, the component 331 of the outer joint part 311 includes an inner step 341 and thereafter changes into a tubular member 361. The open cross-section of the tubular member 361 is closed by a clamped-in cover 362. In the region directly adjoining the ball stops 345, the component 331 extends in the form of an internally cylindrical portion 363 so that spherical surface parts of the inner surface of the component 331 are not formed directly. A sleeve 364 is inserted into the internally cylindrical portion 363 which axially stops against the inner surface 365 of the step 341. The sleeve 364 includes an internally spherical surface 366 which replaces the surface part 46 shown in FIG. 1. The sleeve 364 is preferably fitted in the outer part by a press-fit.

However, the sleeve 364 does not end in surface 366 but extends as far as the opposed end of the inner joint part. At the end it forms a second internally spherical surface 372 of the inner surface of the outer joint part. Circumferentially distributed apertures 373 are provided between the surfaces 366 and 372. The apertures 373 do not obstruct the path of the balls between the planes M between the stops. The apertures 373 may merely form additional lateral guiding means for the balls. The second component 332 is cut away within the stop face 351.

In the embodiment according to FIG. 3, assembly takes place such that first, the sleeve 264 is inserted into the first component 231 of the outer joint part 211. Subsequently the balls 213 are introduced into the inner joint part. Finally, the second component 232 of the outer joint part 211 is joined and connected to the first component 231.

In the embodiment according to FIG. 4, a pre-assembly step takes place wherein the inner joint part 312 and the sleeve 364 are fitted together. The inner joint part is turned by 90° relative to the illustrated position and partially threaded into the apertures 373 of the sleeve 364, whereupon it is pivoted. Subsequently, the balls 313 may be radially inserted into the apertures 373. The pre-assembled unit is then axially slid into the first component 331 of the outer joint part. The second component 332 of the outer joint part is joined and connected to the first component.

FIG. 5 shows a half longitudinal section through a constant velocity universal joint wherein, with the exception of the inner joint part and the way in which it is fixed to the shaft journal, all details correspond to those shown in FIG. 1.

The reference numbers of the respective details have been increased by 400 and are not described in greater detail. The difference is the inner joint part 412 includes three disc-shaped elements. The three disc-shaped elements are fixed to the plug-in journal 415 by shaft teeth 418 and secured by a securing ring 419 against a collar 420 on the plug-in journal 415. Only the central disc member 481 includes inner ball tracks 453 which hold the balls in the circumferential direction and axially guide same between the central planes M. The two outer disc members 482, 483 each constitute rotational members which are provided with inner axial stops 484, 485.

The rotationally symmetrical stop faces may replace or complement the stop faces 445, 451 in the outer joint part. Furthermore, the disc members 482, 483 form surface parts 486, 487 of the outer surface of the inner joint part. The surface parts cooperate with the surface parts 446, 447 of the inner surface of the outer joint part. The disc members 482, 483 are turned or are solid formed parts.

FIG. 6 is a half longitudinal section through a constant velocity universal joint where, with the exception of the inner joint part and the way in which it is fixed on the shaft journal, all details correspond to those shown in FIG. 1. The reference numbers of the respective parts have been increased by 500 and will not be referred to in greater detail.

The difference is the inner joint part 512 includes three disc-shaped elements which are each fixed on the plug-in journal 515 by shaft teeth 518 and secured by a securing ring 519 against a collar 520 on the plug-in shaft 515. Only the central disc member 581 includes inner ball tracks 553 which hold the balls in the circumferential direction and axially guide same between the central planes M. The two outer disc members 582, 583 constitute rotational members which are provided with inner axial stops 584, 585.

The rotationally symmetrical stop faces may replace or complement the stop faces 545, 551 in the outer joint part. Furthermore, the disc members 582, 583 form surface parts 586, 587 of the outer surface of the inner joint part. The surface parts cooperate with the surface parts 546, 547 of the inner surface of the outer joint part. The disc members 582, 583 are formed metal parts.

FIG. 7 shows a constant velocity universal joint in accordance with the invention whose details are largely identical to those of FIG. 1. The outer joint part 611 is only shown to differ in respect of connecting and sealing of the parts 631, 632 because the U-shaped clamp 634 is broken away in the illustration. However, as in FIG. 1, it continues in the form of a holding portion for a sealing element. A sealing element in the form of a convoluted or rolling boot is also secured on the adjoining shaft.

Considerable differences exist in the inner joint part 612. The inner joint part 612 is formed in one piece out of a hollow shaft 616. The shaft 616 includes a central track portion to form a ball track 653 with a circular-arch-shaped track center line and is provided with adjoining beads 684, 685. Furthermore, the rolling movement of the balls is limited by the closer axial stops 645, 651 in the outer joint part.

The joint may be assembled such that, first, the inner joint part 612 is introduced into the first component of the outer joint part 611. The possibility of subsequently inserting the balls remains. Finally, the first component of the outer joint part is connected to and closed by the component previously slid on to the shaft.

While the above detailed description describes the preferred embodiment of the present invention, the invention is susceptible to modification, variation and alteration without deviating from the scope and fair meaning of the subjoined claims.

We claim:

1. A universal joint for small articulation angles, comprising:
    an outer joint part having parallel, longitudinally extending tracks, including inner surface parts which are interrupted by the tracks and which act as guiding faces;
    an inner joint part having parallel, longitudinally extending tracks, said inner joint part including outer spherical surface parts which are interrupted by the tracks and which act as sliding faces;
    torque transmitting balls axially freely movably held in an uncontrolled way in said tracks of said inner and outer joint parts;
    the tracks in the two joint parts including a constant cross-section adapted substantially, without a clearance, to the balls and with the rolling movement of the balls being limited by axial stops in one of the joint members; and
    when the joint is articulated, the surface parts acting as guiding faces supportingly act on the surface parts acting as sliding faces around one fulcrum positioned on the longitudinal axis of the outer joint part; and
    wherein the surface parts in the outer joint part acting as guiding faces each include surface parts axially spaced from one another, which, substantially, are positioned at both ends of the tracks.

2. A universal joint according to claim 1, wherein the surface parts in the outer joint part acting as guiding faces are one of internally spherical and internally conical in shape.

3. A universal joint according to claim 1, wherein in the area of contact with the surface parts of the inner joint part acting as sliding faces and the surface parts in the outer joint part acting as guiding faces are positioned on a spherical surface around said single fulcrum on the longitudinal axis of the outer joint part.

4. A joint according to claim 1, wherein in a longitudinal section, the track center lines of the tracks in both joint parts extend linearly and in an axis-parallel way.

5. A joint according to claim 1, wherein in a longitudinal section, the track center lines of the tracks at least in the inner joint part extend in a circular arch around the joint center.

6. A joint according to claim 1, wherein the outer joint part includes two formed parts with the tracks and first ones of said axial stops for the balls being formed in one of said parts and the second of said parts forms second ones of said axial stops for the balls.

7. A joint according to claim 6, wherein the two formed parts each form part of the surface parts of the inner surface of the outer joint part serving as guiding faces.

8. A joint according to claim 6, wherein the first component of the outer joint part is formed in one piece out of a tubular member.

9. A joint according to claim 1, wherein at least part of the surface parts of the inner surface of the outer joint part serving as guiding faces are formed by a sleeve member inserted into the outer part.

10. A joint according to claim 9, wherein all surface parts of the inner surface of the outer joint part serving as guiding faces are formed by the sleeve member which is inserted into the outer part and which includes circumferentially distributed apertures for receiving the balls freely axially movable therein when the joint is articulated.

11. A joint according to claim 1, wherein the inner joint part includes at least two disc members, at least one of which forms further axial stops for the balls and that the at least one second one forms the tracks.

12. A joint according to claim 11, wherein the second disc member forming the tracks simultaneously forms first ones of said further axial stops for the balls.

13. A joint according to claim 12, wherein a third disc member forms second ones of said further axial stops for the balls.

14. A joint to claim 1, wherein the inner joint part includes a one-piece tubular member which forms the tracks for the balls.

* * * * *